United States Patent [19]

Zirps

[11] 4,336,903

[45] Jun. 29, 1982

[54] CONTROL VALVE

[75] Inventor: Wilhelm Zirps, Hemmingeb, Fed. Rep. of Germany

[73] Assignee: Robert Bosch GmbH, Stuttgart, Fed. Rep. of Germany

[21] Appl. No.: 175,183

[22] Filed: Jul. 31, 1980

[30] Foreign Application Priority Data

Aug. 10, 1979 [DE] Fed. Rep. of Germany ....... 2932481

[51] Int. Cl.³ ........................................... G05D 27/00
[52] U.S. Cl. .............................. 236/92 R; 236/93 R; 236/99 J; 137/491; 137/468; 91/419
[58] Field of Search ............ 236/DIG. 5, 92 R, 93 R, 236/93 A, 99 R, 99 A, 99 J; 137/72, 73, 468, 491

[56] References Cited

U.S. PATENT DOCUMENTS 1,848,031 3/1932 Spencer ........................... 137/468 X
2,820,473 1/1958 Reiners ........................... 236/92 R X
3,401,605 9/1968 Born .............................. 137/491 X Primary Examiner—Harold W. Weakley
Attorney, Agent, or Firm—Michael J. Striker

[57] ABSTRACT

The control valve for keeping a constant temperature or viscosity of a pressure medium in a hydraulic consumer circuit includes a main control valve provided with a control slider and a preliminary control valve in which a temperature sensitive control element is arranged in such a manner that upon reaching a predetermined temperature of the medium a bypass channel is established between the inlet and the outlet of the valve.

9 Claims, 1 Drawing Figure

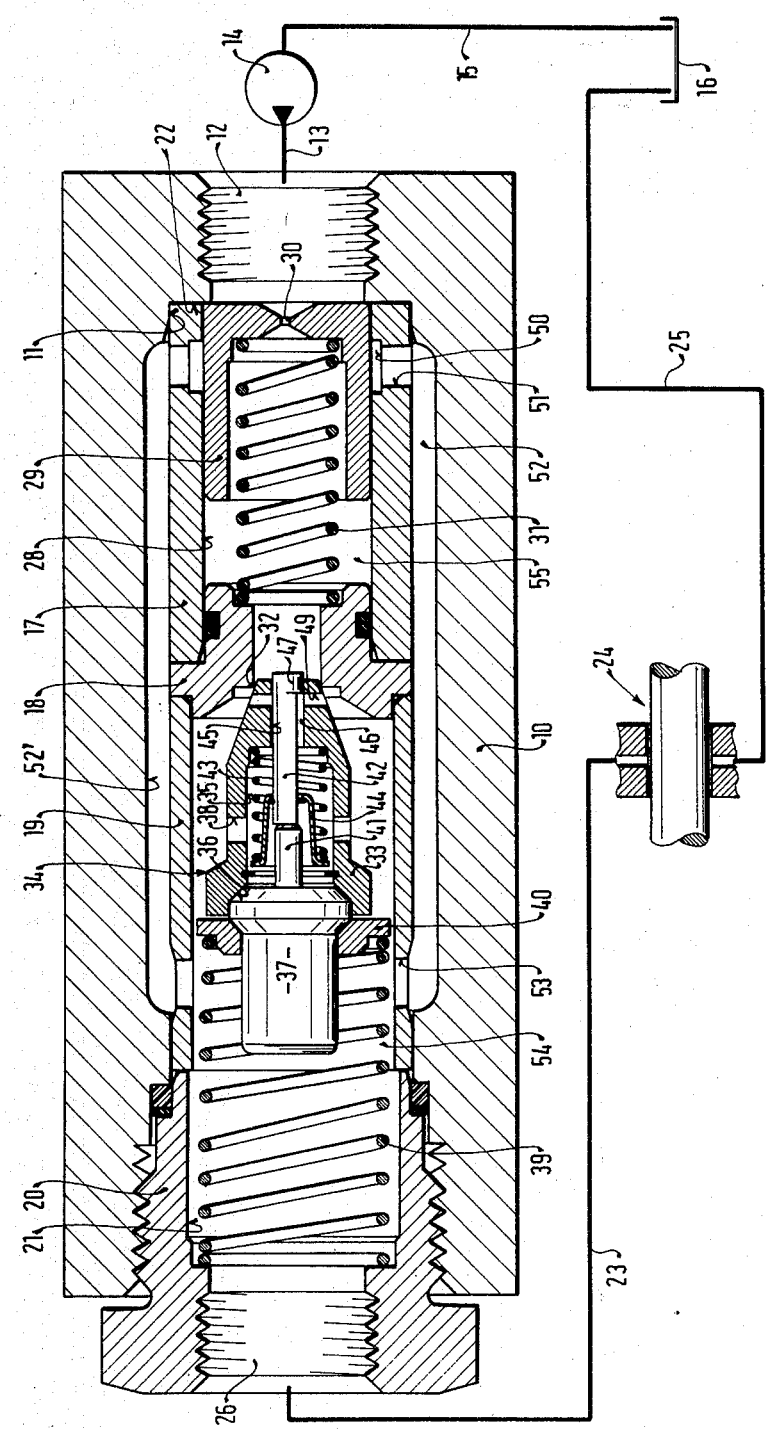

CONTROL VALVE

BACKGROUND OF THE INVENTION

This invention relates generally to a control valve for a hydraulic circuit, and in particular to a control valve for keeping a constant viscosity or temperature of a pressure medium in the hydraulic circuit by means of a throttle provided on a slider of the valve and by a thermally expandable control element which controls the circulation of the presence medium in response to its temperature.

In a known control valve of this kind the thermally extendable control element acts immediately on the valve body. In addition, a partial stream of the pressure medium flowing through a throttle flows around the thermally extandable control element and consequently the sensing of the temperature and thus the temperature control is relatively inaccurate. In the event that the throttle is clogged the pressure medium becomes overheated.

SUMMARY OF THE INVENTION

It is therefore a general object of the present invention to overcome the aforementioned disadvantages.

More particularly, an object of the invention is to provide an improved control valve in which the temperature of the pressure medium can be kept at a constant predetermined value.

An additional object of the invention is to provide such an improved control valve which prevents any clogging or fauling of the valve and thus the overheating of the pressure fluid.

In keeping with these objects, and others which will become apparent hereafter, one feature of the invention resides in a control valve of the above-described type in a combination which comprises a tubular valve body defining an inlet port and an outlet port for the pressure medium, a control slider arranged for reciprocating movement in the valve body and including means for throttling the medium, a preliminary control valve arranged in the valve body downstream of the throttling means in the control slider and including a temperature sensitive control element, and additional throttling means bypassing the preliminary control valve and being controlled by the control element in response to the temperature of the pressure medium.

Preferably, the control element is made of a thermally extandable material which controls a throttling passage in the preliminary control valve.

The preliminary control valve includes a poppet which is spring biased against a seat and the thermally extandable control element is interposed between the puppet and the biasing spring. The thermally extandable control element is provided with a pin which projects into a center passage in the poppet of the preliminary control valve and acting against a control pin which is spring biased in opposite direction to the biasing spring of the poppet and controls a throttling bypass conduit formed in the poppet and communicating with the throttling means in the control slider.

The center bore in the poppet of the preliminary control valve communicates via transverse passages with the outlet of the control valve to provide an additional bypass channel when the temperature sensitive element becomes inoperative.

The control slider of the valve is also spring biased against the direction of flow of the pressure medium and the first mentioned throttling means in the control slider are constituted by a throttling opening communicating with the inlet for the pressure medium.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows an axial cross-section of the control valve of this invention.

DESCRIPTION OF THE PREFERRED EMBODIMENTS

The control valve of this invention includes a housing 10 formed with a through-going longitudinal bore 11 one end of which forms an inlet port for the pressure medium. The inlet 12 is connected via conduit 13 to the pressure side of a pump 14 which delivers the pressure medium which is sucked in via a suction conduit 15 from a tank 16.

The major intermediate portion of the bore 11 in the housing 10 is extended into a cylindrical space 52' through which passes a tubular assembly composed of consecutively arranged control valve sleeve 17, a seat body 18 of a preliminary control valve and a spacing sleeve 19 which are pressed by means of the hollow screw 20 defining a through-going passage 21, against a shoulder 22 at the inlet end of the longitudinal bore 11. The open end of the passage 21 in the screw 20 forms the outlet for the pressure medium passing through the control valve of this invention. The outlet 26 is connected via a conduit 23 to a consuming device 24 which in this example is a shaft lubricating device which is connected via a return conduit 25 to the tank 16. For a proper operation of the lubricating device 24 it is essential that the pressure medium passing therethrough have always the same temperature or viscosity.

A control slider 29 is tightly guided in the central bore 28 of the control sleeve 17. The control slider has a cup-shaped configuration with its bottom part facing the inlet 12. The center of the bottom part of the slider 29 is formed with a throttling opening 30. The control slider 29 is pressed by a biasing spring 31 resting on the seat body 18 against the shoulder 22 of the longitudinal bore 11.

The seat body 18 of the preliminary control valve defines a central passage with a seat 32 cooperating with a poppet 33 of the preliminary control valve 34. The poppet 33 is formed with a blind bore 35 which communicates via transverse passages 38 with an interspace between the outer surface of the poppet 33 and the inner wall of the spacer sleeve 19. The open end of the blind bore 35 is formed with a shoulder 36 which accommodates a temperature sensitive control element 37 made of a thermally extendable material. The element 37 is pressed against the poppet 33 by means of another biasing spring 39 situated in the through-bore 21 of the hollow screw 20. The biasing spring 29 rests at one end on a step in the bore 21 and at the other end on a spring-retaining plate 40 mounted on the element 37 so that the biasing spring 39 presses via the element 37 the poppet 33 against the edge 32 of the valve seat.

The end of the temperature sensitive control element 37 communicating with the blind bore in the poppet 33 is provided with a piston-like pin 41 which is in contact with the end of a control pin 42 for an additional throttle as will be explained below. The control pin 42 is positively urged against the pin 41 of the element 37 by means of a pressure spring 43 resting on the bottom of the blind bore 35 and acting against a spring retaining plate 44 connected to the pin 42. The free end of the control pin 42 passes through a throttling bore 45 formed in the closing part of the poppet 33 coaxially with the central axis of the blind bore 35 and of the valve seat 32. Control pin 42 is formed at its end remote from the control element 37 with a collar 47 which closes an inlet portion of the throttling bore 45 whereas the remaining part of the pin 42 is formed with a flat recess which defines with the throttling bore a gap 46. Transverse passages 49 formed in the inlet end portion of the poppet 33 immediately behind the collar 47 connect the throttling bore 45 with the intermediate space in the spacer sleeve 19.

The inner wall of the control sleeve 17 is formed in the proximity to the shoulder 22 with an annular recess 50 which communicates via transverse passages 51 with an annular space 52 formed between the outer surface of the tubular assembly 17 through 19, and the inner wall of the cylindrical recess 52'. At the end of the annular space 52 remote from the transverse passages 50 there are provided in the spacer sleeve 19 similar transverse passages 53 communicating with an outlet chamber 54 into which a major portion of the temperature sensitive control element 37 projects. The variable space behind the control slider 29 is designated by a reference numeral 55.

The operation of the control valve of this invention is as follows:

Pressure medium discharged from the pump 14 enters via inlet 12 the interior of the valve housing 10 and attacks through the throttle opening 30 in the control valve 29 the poppet 33 of the preliminary control valve 34.

At the beginning of the lubricating operation, the pressure medium is cold and consequently the piston-like pin 41 of the temperature sensitive control element 37 is retracted and consequently its end collar 47 closes the inlet part of the throttling bore 45. Upon the subsequent increase of the pressure of the medium the poppet 33 is displaced against the force of its biasing spring 39 from the seat 32 of the preliminary control valve and the pressure fluid flows via the throttling opening 30 and the preliminary control valve 34 through the outlet 26 of the valve to the consuming device 24. Due to the pressure gradient across the throttle opening 30, the slider 29 is displaced against the force of its biasing spring 31 in the direction toward the preliminary control valve until a connection is established between the inlet 12 and the annular groove 50. At this moment, the pressure fluid starts flowing through the annular space 52 and the transverse passages 53 into the outlet chamber 54 where it contacts the temperature sensitive control element 37. Upon reaching a predetermined maximum temperature value desired for the proper lubricating operation of the pressure fluid, the piston-like pin 41 is extended against the control pin 42 to such an extent that the end collar 47 of the latter emerges out of the throttling bore 45 whereby a bypassing connection is established, that means the pressure fluid flows from the inlet 12 to the outlet 26 not only through the annular space 52 but also through the spaces 55 along the gap 46, the interior of the poppet 33, the transverse passages 38 in the poppet and the chamber 54.

With increasing temperature of the pressure medium the pressure drop across the preliminary control valve is reduced and consequently the biasing spring 39 compresses again the poppet 33 against the seat 32. At the same time, the piston like pin 41 is still further displaced to the right by the thermal expansion of the material of the element 37 and consequently it continues to displace the collar 47 of the control pin 42 out of the throttling passage 45. Accordingly, the bypassing channel for the pressure fluid from the space 55 remains open until the temperature of the pressure fluid is stabilized. In other words, the pressure drop between the inlet 12 and the outlet 26 is controlled by the magnitude of the bypass channel between the collar 47 and the throttling bore 45 in dependency on the temperature of the pressure medium. As a consequence, any temperature variations caused during the lubricating operation are eliminated. The heating of the pressure medium occurs due to the throttling in the control slider and in the preliminary control valve.

In the event that no liquid is in contact with the temperature sensitive element 37, the piston-like pin 41 is retracted to the left and consequently the control pin 42 by the action of pressure fluid acting against the collar 47 is also displaced to the left to such an extent that a connection is established between the space 55 and the transverse passages 49 in the poppet 33. The reduced pressure in the space 55 causes a proportional displacement of the control slider 29 to the left against the force of the biasing spring 31 and permits the pressure medium from the inlet 12 to flow without any throttling through the annular space 52 to the outlet 26. In this manner any overheating of the pressure medium which might be caused due to the inoperativeness of the control element 37, is avoided.

It will be understood that each of the elements described above, or two or more together, may also find a useful application in other types of constructions differing from the types described above.

While the invention has been illustrated and described as embodied in a control valve for use with a lubricating circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the general or specific aspects of this invention.

What is claimed as new and desired to be protected by Letters Patent is set forth in the appended claims:

1. A control valve for keeping constant viscosity or temperature of a pressure medium in a hydraulic circuit, comprising a valve housing defining an inlet and an outlet for the pressure medium; a control slider arranged for reciprocating movement in said housing and including means for throttling said medium; a preliminary control valve arranged in said housing downstream of said throttling means in said control slider and including a temperature sensitive control element made of a thermally extendable material which controls said additional throttling means, said preliminary control valve including a poppet and a valve seat, said poppet being controlled through said temperature sensitive control element and being spring biased against said valve seat, said poppet being formed with a blind bore defining a shoulder at its open end and said control element being seated on said shoulder.

2. A control valve as defined in claim 1, wherein said control element is formed with a piston-like pin projecting into said blind bore and said additional throttling means including a passage formed in said poppet concentrically with said blind bore and a control pin spring biased against said piston-like pin of the control element and passing through said throttling passage to provide a bypass channel for the pressure medium when the temperature of the latter attains a predetermined level.

3. A control valve as defined in claim 2, wherein said control pin has at its end remote from the control element a control collar providing an adjustable throttling passage in said bypass channel.

4. A control valve as defined in claim 3, further including transverse passages connecting the throttling bore in said poppet with said outlet to provide an auxiliary bypass channel in the event when the temperature sensitive control element becomes inoperative.

5. A control valve as defined in claim 4, wherein said first-mentioned throttling means is a throttling opening formed in said control slider opposite said inlet whereby said control slider is spring biased toward said inlet.

6. A control valve for keeping constant viscosity or temperature of a pressure medium in a hydraulic circuit, comprising a valve housing defining an inlet and an outlet for the pressure medium; a control slider arranged for reciprocating movement in said housing and including means for throttling said medium so as to provide temperature increase of the latter; a preliminary control valve arranged in said housing downstream of said throttling means in said control slider; and including a temperature sensitive control element arranged in said preliminary control valve; and additional throttling means bypassing said preliminary control valve and cooperating with said temperature sensitive control element to regulate the amount of the bypassed pressure medium as a function of the temperature of the latter, said temperature sensitive control element being arranged to allow the bypassing only when a predetermined temperature is reached.

7. A control valve as defined in claim 6, wherein said temperature sensitive control element is made of a thermally extendable material which controls said additional throttling means.

8. A control valve as defined in claim 7, wherein said preliminary control valve includes a poppet and a valve seat, said poppet being controlled through said temperature sensitive control element and being spring biased against said valve seat.

9. A control valve as defined in claim 8, wherein said temperature sensitive element is arranged in said poppet of said preliminary control valve.

* * * * *